United States Patent [19]
Trimble

[11] 3,834,765
[45] Sept. 10, 1974

[54] DECORATIVE AND SAFETY ATTACHMENT FOR SPOKE WHEELS

[76] Inventor: Robert C. Trimble, 258 Main St., Northboro, Mass. 01532

[22] Filed: Jan. 21, 1974

[21] Appl. No.: 435,322

[52] U.S. Cl.......... 301/37 R, 301/37 SA, 40/129 B
[51] Int. Cl............................................. B60b 7/00
[58] Field of Search.... 301/37 R, 37 SA; 40/125 M, 40/129 B

[56] References Cited
UNITED STATES PATENTS

| | | | |
|---|---|---|---|
| 607,703 | 7/1898 | Peters | 301/37 SA |
| 3,310,357 | 3/1967 | Hogan | 301/37 SA |
| 3,565,489 | 2/1971 | Eirinberg et al. | 40/129 B |

*Primary Examiner*—M. Henson Wood, Jr.
*Assistant Examiner*—Victor N. Sakran
*Attorney, Agent, or Firm*—Melvin E. Frederick

[57] ABSTRACT

Decorative and safety wheel tubular member, particularly adapted for spoke wheels of bicycles, motorcycles, and the like, comprising a flexible member, preferably in the form of an extruded, flexible hollow length, having a light reflective outer surface and of a diameter to engage the inner portions of the spokes of the wheel and of a length to close on itself within the wheel and around the hub thereof, with means such as a plug or sleeve to hold the ends of the member together in abutting relationship, and the combination thereof with a spoke wheel. The tubular member is introduced between the spokes and is of a length that when its ends meet it is in contact with all of the spokes of the wheel. The tubular member is desirably formed with a reflective outer surface and with marks designating suitable length for smaller wheels.

10 Claims, 5 Drawing Figures

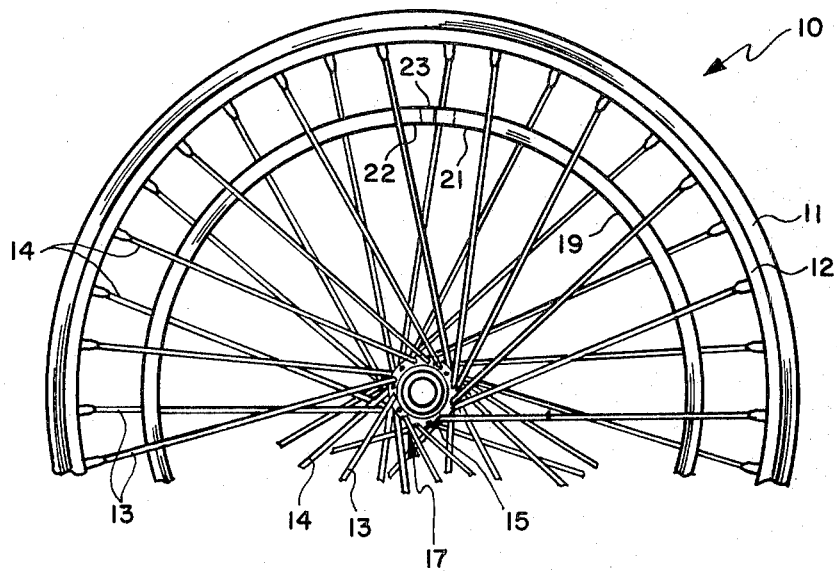
FIG. 1
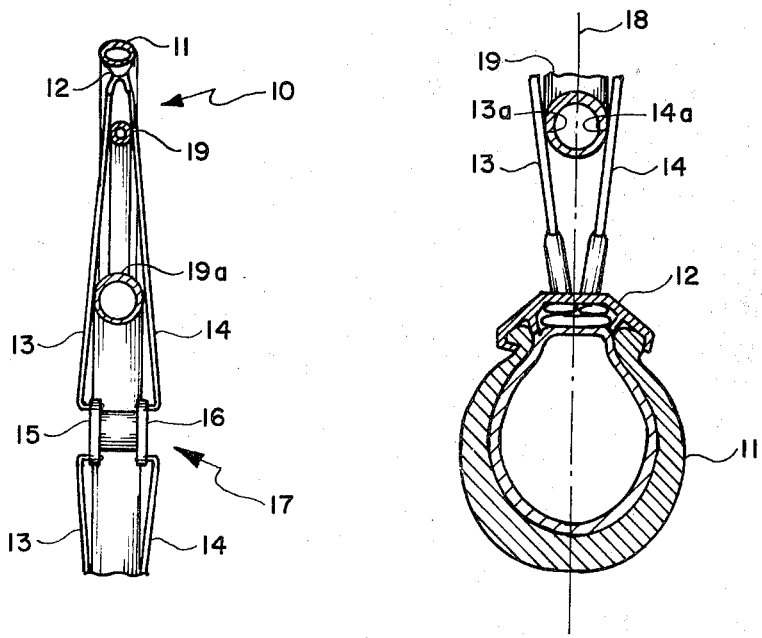
FIG. 2
FIG. 3

DECORATIVE AND SAFETY ATTACHMENT FOR SPOKE WHEELS

The present invention relates to a novel, decorative and safety tubular member for use in conjunction with spoke wheels which can be readily introduced between and held by opposite spokes and more particularly to a reflective device for use in conjunction with vehicles having spoke wheels which renders the vehicle, whether moving or standing still, more visible so that the possibility of accidental collision is measurably reduced.

In decorative and reflector devices such as are commonly used at present, such devices are generally in the form of small faceted glass devices permanently mounted by means of screws and the like to the fenders, frame, or rim of the wheels of the vehicle. Devices of this type are small, are limited in reflection value, and tend to give a false sense of security inasmuch as the drivers of other vehicles have difficulty seeing the small devices or see them too late to avoid a collision. The known reflectors heretofore used for this purpose are effective only over a narrow angle of view and are generally totally ineffective when viewed from the side of the vehicles rather than from the front or the back. As noted above, known reflectors are subject to the particular disadvantage in that they are ineffective in signaling vehicles approaching at right angles.

The primary object of the present invention is to provide in a manner as hereinafter set forth a decorative and/or safety reflective device that may be expeditiously combined with a spoke wheel without structurally altering the wheel, interfering with its use or servicing thereof, or requiring the use of any attaching means such as clamps, screws and the like.

Another object of the present invention is to provide a decorative and/or reflective device for combination with spoke wheels which is of the simplest construction, strong, durable, light-weight, attractive in appearance, unbreakable, easily cleaned, and which may be manufactured at low cost.

A further object of the present invention is to provide a decorative and/or reflective device forming a novel combination with a spoke wheel.

A still further object of the present invention is to provide a reflective device of generally tubular shape that is easily combined with a spoke wheel and does not require the use of any tools for installation and which is not affected by either rotation or vibration of the wheel.

A further object of the present invention is the provision of a reflective device for combination with spoke wheels which can be seen from substantially any angle of view.

A still further object of the present invention is the provision of a reflective device which can easily be mounted without requiring the use of tools upon existing spoke wheels without the necessity of making any modification to the wheels or providing means to attach the reflective device to the wheel.

The above objects together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary view in side elevation of a spoke wheel having inserted between its spokes a device in accordance with the invention;

FIG. 2 is a cross sectional view of a wheel in accordance with the invention;

FIG. 3 is an enlarged fragmentary cross sectional view through a rim, tire, and spokes, showing a device in accordance with the invention assembled therewith;

Figure 4:
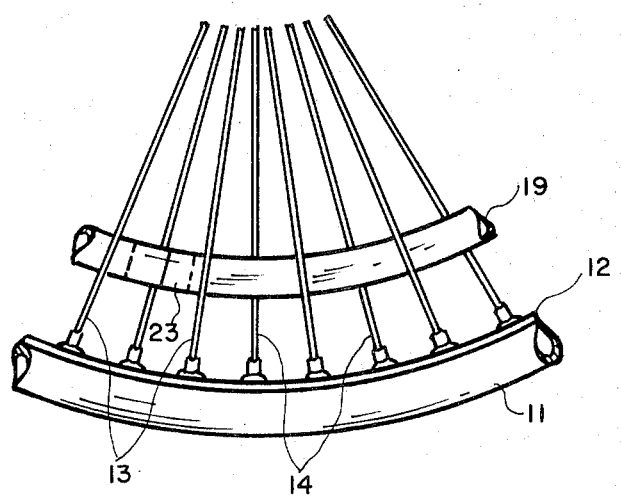
Figure 5:
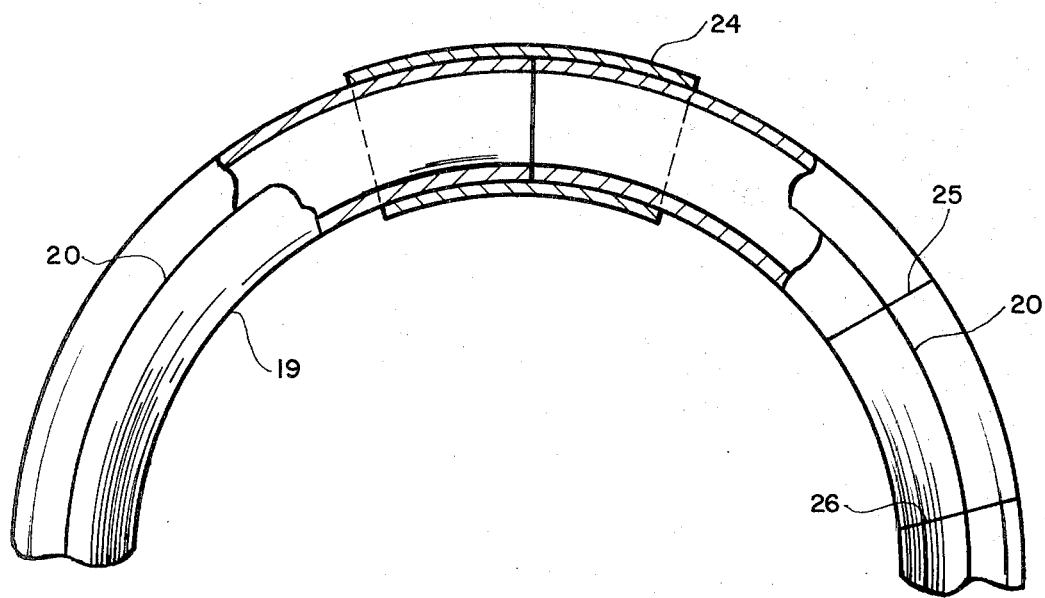

FIG. 4 is an enlarged fragmentary side sectional view of a spoke wheel and tubular reflective device removably closed on itself with a plug in accordance with the invention and mounted in the wheel; and FIG. 5 is a fragmentary side view of a tubular device with parts broken away illustrating the use of a sleeve to join the ends and showing how the device can be readily adapted for use with various size wheels.

The present invention is especially useful with bicycles of the conventional type which includes a frame, front forks mounted upon the hub of a front wheel, the front forks being pivotally mounted with respect to the frame and adapted to be steered by handle bars. Rear fork members converge at the rear end and are connected to the hub of a rear wheel. The rear wheel hub carries a small sprocket which is connected by a drive chain to a large pedal sprocket. Mounted for rotation with the large sprocket are oppositely extending crank arms carrying pedals. A seat for the rider is carried by the frame. Depending upon the type of construction a conventional type of coaster brake may be provided in the rear hub or caliper type brakes actuated from the handle bar may be provided on either or both of the wheels.

Directing attention now to the wheels, FIG. 1 and FIG. 2 illustrate by way of example a portion of a spoke wheel designated generally by the numeral 10 for bicycles and the like comprising a pneumatic tire 11, a rim 12, and spokes 13 and 14. As is well known, the spokes 13 and 14 are alternately secured to opposite end 15 and 16 of an axially elongated hub 17. In other words the spokes 13 are attached to the near end 15 of the hub 17 of the wheel 10 as shown in FIG. 1 (the left end in FIG. 2) and define a cone surface converging outwardly of FIG. 1 (and to the left in FIG. 2) whereas the spokes 14 extend to the other end 16 (not shown in FIG. 1) of the hub and define a second cone surface on the other side of the wheel (and extending to the right in FIG. 2). As may best be seen in FIG. 2 and FIG. 3 the spokes 13 and 14 slope in opposite directions from a plane 18 (see FIG. 3) passing through the center of the rim and halfway between the ends of the hub.

An attachment in accordance with the invention preferably comprising an elongated flexible tubular member 19 is shown in FIGS. 1, 2, and 3 inserted between the spokes 13 and 14. The tubular member 19 may comprise a flexible tubular length of extruded plastic circular in cross section and of a size to engage, when mounted within the wheel, the inner portions 13a and 14a of the spokes intermediate their ends (see FIGS. 2 and 3) generally nearer the rim than the hub as shown in FIG. 3. While the tubular member 19 may be formed of a number of flexible materials including rubber, conventional synthetic plastics are preferred because of their low cost, the ease with which they may be formed as by extrusion and/or combined with other materials such as fluorescent dyes and light reflective particles which may be mixed with them. Thus the material used to form the member 19, while it must be flexible and resilient, may be of any desirable substance: for example, polyethylene, vinyl chloride, cellulose acetate butyrate, and the like.

The tubular member is attached to the wheel by inserting one end 21 between the spokes 13 and 14 and threading it between the succeeding spokes until it has been threaded between all of the spokes on the wheel. If the tubular member is to be held securely, it is then pressed toward the rim so that it engages the inner portion of all of the spokes as shown for example in FIG. 3. If the tubular member has a constant or uniform cross section along its length it will be spaced substantially uniformly form the rim as shown for example in FIG. 1. The excess portion of the member is then cut off (where the member has a length greater than that necessary for its ends to meet or close on themselves for any particular size of wheel) and the ends 21 and 22 securely joined as for example by a plug 23 (see FIGS. 1 and 4) or a sleeve 24 (see FIG. 5).

As will now be apparent while a member 19 mounted in a wheel as shown and described herein needs no separate attaching means for purposes of retention it is still totally insensitive to rotation or vibration of the wheel. In fact, even if the end connecting means is lost it is virtually impossible for member 19 to come out of the wheel.

The relatively close spacing of the spokes and their slope in opposite directions is utilized to retain the member thereby obviating any necessity for separate clamping or securing means. This greatly reduces the cost of manufacture and packing, eliminates the possibility of such means (including the member itself) from being lost and permits even the youngest of bicycle riders to mount the device on his or her bicycle.

The member may of course be of such length as to just fit any given wheel. However, to permit the members to be made in an economical manner and so that they may be adjusted to spoke wheels of different diameters, the member is preferably made of a length to at least close on itself when inserted in the largest size wheel. Thus, one or more lines 25 and 26 as shown in FIG. 5 may be provided designating the proper size for given wheels of smaller diameter. Generally, at the present time there are three sizes of bicycle wheels, so that two lines are adequate for most purposes. It will be understood, of course, that less or more than two lines may be employed for greater flexibility as to size and type of wheel when such is indicated.

While less preferable the tubular member 19 may be solid. A light-weight hollow member is preferred for reasons of economy, manufacture and shipping and to make it easier to be mounted in a wheel. The member may be one or different colors, the colors being preferably irridescent. Further, it may be of round, square, or wedge shape cross section. The member may be distributed either in coils or in predetermined lengths, preferably approximately twice that of the circumference of the largest size wheel. Further, the members when formed may include a suitable fluorescent dye to increase its visibility both during the day and at night.

While the member may be provided with a light reflective outer surface as by coating or applying a light reflective material under a protective transparent coating having, for example, a large number of small refracting and relecting prismatic surfaces for receiving light and redirecting it generally along its incoming path, it preferably includes a fluorescent dye which fluoresces both under sunlight and artificial light.

Since the outer surface of the member is curved in all directions it will be understood that light coming from substantially any direction will be reflected thereby rendering a bicycle or the like equipped with such a member easily visible from substantially any direction.

If visibility is desired from both directly behind and forward this may be accomplished by providing the member with a diameter greater than that of the tire as best shown at 19a in FIG. 2. This is possible since the hub is always considerably longer than the diameter of the tire. When a member of such diameter is mounted on a wheel a portion of it will extend out past the tire on each side.

Further, to increase visibility the member may be provided with a varying cross section to cause it when mounted in a wheel to be eccentric with respect to the hub of the wheel. For this particular case the member may be formed of plastic tubing provided with a single slit 20 as shown in FIG. 5 extending its length to permit the sides to be squeezed into an overlapping arrangement and thereby vary the cross sectional size. Accordingly, when a wheel so equipped rotates the member will appear to move up and down and thereby more easily catch the attention of approaching drivers. Additionally, if the diameter is made to be comparable to the length of the hub, such a member can easily be made to fit securely anywhere along the radius of the wheel at a constant or varying distance from the hub and/or a plurality of members provided in a single wheel.

As will now be evident an elongated flexible cylindrical member formed of a resilient material when combined with a spoke wheel in accordance with the invention shown and described herein provides a new and novel decorative member and is of particular additional value from a safety point of view when it is provided with a reflective outer surface. Such a device does not in any way affect servicing or use of a wheel with which it is combined. Thus, the tire may be inflated or repaired, the wheel removed or attached to the frame, the wheel padlocked, the spokes adjusted, or the wheel trued with the member in place. It is virtually unbreakable; no tools are required for its installation and particularly its retention; it is easily adaptable to fit any size wheel, may be installed by anyone old enough to ride a bicycle, does not tend to collect dirt, oil and the like, and when it does get dirty it may be cleaned by simply wiping it with a cloth.

In addition to all of the above advantages it is inexpensive to manufacture and purchase, and when its outer surface is rendered light reflective, it provides virtually the greatest possible degree of visibility from substantially any direction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for vehicle spoke wheel of the type having a central elongated hub, a rim adapted to receive a tire, and spokes all connected at one end to the rim around its periphery and alternately connected at their other end to opposite ends of the hub comprising:

a. an elongated flexible tubular member of resilient material for insertion between all of said spokes and around said hub, said member being of such a length and cross section that when disposed inside of said spokes its ends meet and along its length it contacts an inside portion of each of said spokes; and b. means for coupling together the ends of said member.

2. The attachment of claim 1 in which said tubular member is of substantially uniform cross sectional size and formed of resiliently flexible material including a colored fluorescent dye material whereby when said member is exposed to a source of light it effects a bright hue and renders it highly visible to the human eye.

3. The attachment of claim 1 in which said tubular member is of a varying cross sectional size along its length and formed of a resiliently flexible material having at least in part a light reflective outer surface.

4. The attachment of claim 1 in which the tubular member is of substantially uniform cross sectional size and formed of a resiliently flexible material.

5. The attachment of claim 4 wherein at least a part of the outer surface of said tubular member is light reflective.

6. The attachment of claim 4 wherein said tubular member is provided with a slit extending at least substantially its length whereby the sides of said member may be squeezed into an overlapping arrangement and thereby vary the cross sectional size of said member.

7. The attachment of claim 5 in which said means for coupling together the ends of said tubular member comprises a plug adapted to tightly fit in the ends of said member.

8. The attachment of claim 5 in which said means for coupling together the ends of said tubular member is a sleeve adapted to tightly fit over the ends of said member.

9. The attachment of claim 5 wherein said tubular member is of substantially uniform cross sectional size along its length greater than that of any tire adapted to be mounted on said rim whereby when said member is inserted between said spokes a portion of it will extend out past a tire on said rim and be visible when viewed in the plane passing through said rim and intermediate the ends of said hub.

10. The attachment of claim 9 wherein said tubular member is formed of resiliently flexible thermosetting plastic including a colored fluorescent dye material whereby when said member is exposed to a source of light it effects a bright hue and renders it highly visible to the human eye.

* * * * *